US009425845B2

(12) United States Patent  (10) Patent No.: US 9,425,845 B2
Dos Santos et al.  (45) Date of Patent: Aug. 23, 2016

(54) METHOD OF SETTING UP A COMMUNICATION SESSION VIA AN SWP INTERFACE

(71) Applicant: OBERTHUR TECHNOLOGIES, Colombes (FR)

(72) Inventors: Elder Dos Santos, Colombes (FR); Mickael Destouches, Colombes (FR); Florian Galdo, Colombes (FR); Jean-Philippe Vallieres, Colombes (FR); Gregoire Godel, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/798,622

(22) Filed: Jul. 14, 2015

(65) Prior Publication Data

US 2016/0020801 A1  Jan. 21, 2016

(30) Foreign Application Priority Data

Jul. 15, 2014  (FR) ...................................... 14 56791

(51) Int. Cl.
*H04B 1/3816* (2015.01)
*H04W 4/00* (2009.01)
*H04W 76/02* (2009.01)

(52) U.S. Cl.
CPC ............. *H04B 1/3816* (2013.01); *H04W 4/003* (2013.01); *H04W 76/02* (2013.01)

(58) Field of Classification Search
CPC ..... H04B 1/3816; H04W 4/003; H04W 76/02
USPC ....................................................... 455/558
See application file for complete search history.

(56) References Cited

U.S. PATENT DOCUMENTS

| 8,016,203 B2* | 9/2011 | Charrat | G06K 19/07 235/492 |
| 8,066,193 B2* | 11/2011 | Charrat | G06Q 20/341 235/492 |
| 8,261,996 B2* | 9/2012 | Charrat | G06Q 20/341 235/492 |
| 8,272,573 B2* | 9/2012 | Hartel | G06K 19/07 235/441 |

(Continued)

FOREIGN PATENT DOCUMENTS

EP  2 629 499 A1  8/2013

OTHER PUBLICATIONS

Search Report dated Apr. 29, 2015 from French Application No. 1456791, pp. 1-2.

(Continued)

*Primary Examiner* — Hai V Nguyen
(74) *Attorney, Agent, or Firm* — MH2 Technology Law Group, LLP (57) ABSTRACT

Disclosed are methods performed by, and devices including, a microcircuit card that makes it possible to set up a communication session between the microcircuit card and a contactless communication module via an SWP interface. An implementation of the method comprises: an initialization phase for the SWP interface; and a negotiation phase between the microcircuit card and the contactless communication module, the contactless communication module being suitable for maintaining the power supply of said microcircuit card during these phases. Among other reasons, the method is remarkable in that the microcircuit card prolongs said negotiation phase until the end of a procedure internal to the microcircuit card.

8 Claims, 6 Drawing Sheets

(56) References Cited

U.S. PATENT DOCUMENTS

| | | | | |
|---|---|---|---|---|
| 8,412,920 | B2* | 4/2013 | Thill | G06K 7/0008 |
| | | | | 711/100 |
| 8,649,822 | B2* | 2/2014 | Chen | H04M 1/72522 |
| | | | | 455/41.1 |
| 8,773,376 | B2* | 7/2014 | Batara | G06F 3/04883 |
| | | | | 345/173 |
| 8,977,195 | B2* | 3/2015 | Levy | G06K 7/10237 |
| | | | | 455/41.1 |
| 9,055,432 | B2* | 6/2015 | Leutgeb | H04W 12/00 |
| 9,113,338 | B2* | 8/2015 | Raffard | H04L 63/10 |
| 9,172,480 | B2* | 10/2015 | Leroy | H04H 60/16 |
| 9,214,986 | B2* | 12/2015 | Charles | H04B 5/0037 |
| 9,292,036 | B2* | 3/2016 | Grocutt | G06F 1/12 |
| 2009/0127333 | A1* | 5/2009 | Chamley | G06Q 20/341 |
| | | | | 235/380 |
| 2009/0127345 | A1* | 5/2009 | Chamley | G06Q 20/341 |
| | | | | 235/492 |
| 2009/0134212 | A1* | 5/2009 | Chamley | G06K 19/07 |
| | | | | 235/375 |
| 2010/0108772 | A1* | 5/2010 | Hartel | G06K 19/07 |
| | | | | 235/492 |
| 2010/0151790 | A1* | 6/2010 | Hoeksel | G06K 7/0008 |
| | | | | 455/41.2 |
| 2010/0240303 | A1* | 9/2010 | Charrat | H04B 5/00 |
| | | | | 455/41.1 |
| 2010/0275242 | A1* | 10/2010 | Raffard | H04W 12/12 |
| | | | | 726/2 |
| 2010/0330904 | A1* | 12/2010 | Stougaard | H04L 67/12 |
| | | | | 455/41.1 |
| 2011/0225404 | A1* | 9/2011 | Thill | G06K 7/0008 |
| | | | | 713/2 |
| 2011/0261000 | A1* | 10/2011 | Batara | G06F 3/04883 |
| | | | | 345/173 |
| 2011/0270999 | A1* | 11/2011 | Marseille | G06K 19/07 |
| | | | | 709/228 |
| 2011/0296521 | A1* | 12/2011 | Bernabeu | G06Q 20/341 |
| | | | | 726/19 |
| 2012/0100804 | A1* | 4/2012 | Miles | G06K 7/0008 |
| | | | | 455/41.1 |
| 2012/0178366 | A1* | 7/2012 | Levy | G06K 7/10237 |
| | | | | 455/41.1 |
| 2013/0203466 | A1* | 8/2013 | Chen | H04M 1/72522 |
| | | | | 455/558 |
| 2013/0225074 | A1* | 8/2013 | Charles | H04B 5/0037 |
| | | | | 455/41.1 |
| 2013/0254844 | A1* | 9/2013 | Leutgeb | H04W 12/00 |
| | | | | 726/3 |
| 2014/0019746 | A1* | 1/2014 | Hans | G06F 21/606 |
| | | | | 713/150 |
| 2014/0025940 | A1* | 1/2014 | Giraud | G06F 21/51 |
| | | | | 713/2 |
| 2014/0040991 | A1* | 2/2014 | Potonniee | H04L 63/08 |
| | | | | 726/4 |
| 2014/0082247 | A1* | 3/2014 | Buttner | G06K 7/0008 |
| | | | | 710/301 |
| 2014/0158764 | A1 | 6/2014 | Morin et al. | |
| 2014/0302781 | A1* | 10/2014 | Morris | H04B 5/0056 |
| | | | | 455/41.1 |
| 2015/0181621 | A1* | 6/2015 | Levy | G06K 7/10237 |
| | | | | 455/41.1 |
| 2016/0088560 | A1* | 3/2016 | Banthia | H04W 52/0229 |
| | | | | 370/311 |

OTHER PUBLICATIONS

Smart Cards; UICC—Contactless Front-end (CLF) Interface; Part 1: Physical and data link layer characteristics (Release 100). ETSI Draft, European Telecommunications Standards Institute (ETSI), France, Sep. 6, 2012, vol. SCP, No. V10.0.0, pp. 1-57.

* cited by examiner

METHOD OF SETTING UP A COMMUNICATION SESSION VIA AN SWP INTERFACE

CROSS-REFERENCE TO RELATED APPLICATIONS

This application claims priority to French Application No. 1456791 filed 15 Jul. 2014, the entire disclosure of which is hereby incorporated by reference in its entirety.

BACKGROUND OF THE INVENTION

The invention lies in the field of microcircuit cards suitable for interfacing with a contactless communication module in a terminal.

It should be recalled firstly that the ISO 7816 standard is a standard with very widespread use, in particular in certain secure documents, and in the microcircuit cards used in telecommunications (universal integrated circuit card (UICC) modules or embedded UICC (eUICC) modules) or for making bank transactions secure (smart cards).

It should be observed that a eUICC may be a microcircuit soldered directly to the printed circuit of the telephone.

In particular, the ISO 7816 standard defines protocol layers at "physical", "transport", and "application" levels for enabling communication to be set up between the microcircuit card and a terminal or reader with which the microcircuit card is connected.

The protocol layers at the "transport" and "application" levels enable communication channels to be set up between the microcircuit card and the terminal so that those entities can exchange messages.

Figure 1:
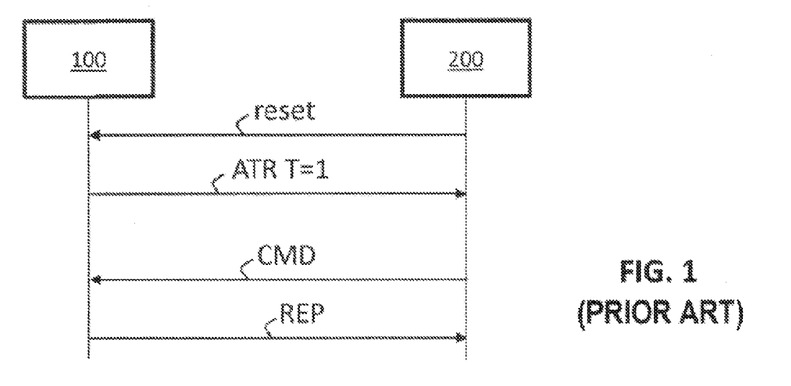
FIG. 1, described above, indicates a prior art startup sequence in accordance with the ISO 7816 standard.

FIG. 1 shows a startup sequence of the ISO 7816 standard between a microcircuit card 100 and a terminal 200, in accordance with the prior art. The communication is communication of the master/slave type, in which the microcircuit card replies (REP general message) to commands (CMD general message) from the master terminal. Thus, by way of example, the microcircuit card replies with the message "ATR T=1" to the "reset" command from the terminal.

In such communication of the master/slave type, the microcircuit card cannot take the initiative of sending a message; it must necessarily wait for a command from the terminal in order to communicate therewith.

Since the microcircuit card is necessarily inactive between two command/reply exchanges, in order to save energy, the terminal can decide to cease powering the microcircuit card during the time interval between receiving a reply from the card and sending the next command to the card.

That can lead to problems if the unpowered card has operations to perform during those time intervals. In order to avoid such drawbacks, the ISO 7816 protocol provides a mechanism whereby the microcircuit card can use a "procedure byte" provided for this purpose in the transport frames in order to request the terminal to provide power for an additional period of time so as to be able to perform operations.

Figure 2:
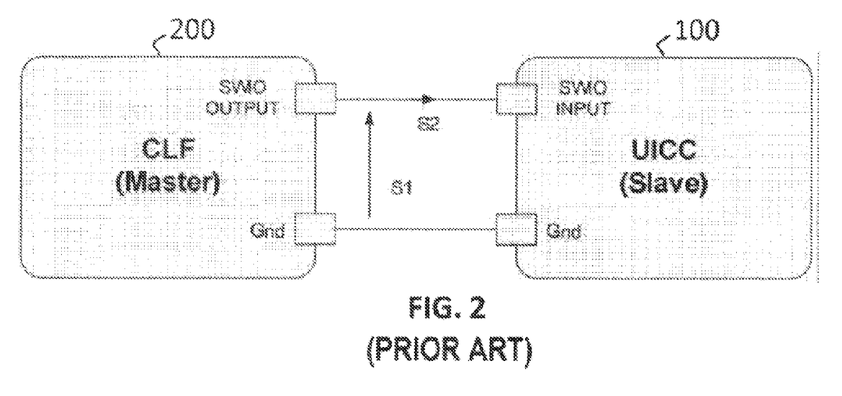
FIGS. 2 and 3, described above, show the logic architecture and the hardware architecture of a prior art SWP interface as defined in ETSI document TS 102 613 V9.2.0.

New generations of microcircuit card are also known that are suitable for communicating with a contactless front end (CLF) communication module using the single wire protocol (SWP) defined in the European Telecommunications Standards Institute (ESTI) document TS 102 613 V9.2.0 and shown in FIG. 2. It should be noted with reference to this figure that the SWP interface provides communication in full duplex mode between the microcircuit card and the contactless communication module, in which:

the signal S1 is a voltage modulated digital signal for messages sent by the contactless communication module 200 to the microcircuit card 100; and the signal S2 is a current modulated digital signal for messages sent by the microcircuit card 100 to the contactless communication module 200.

Figure 3:
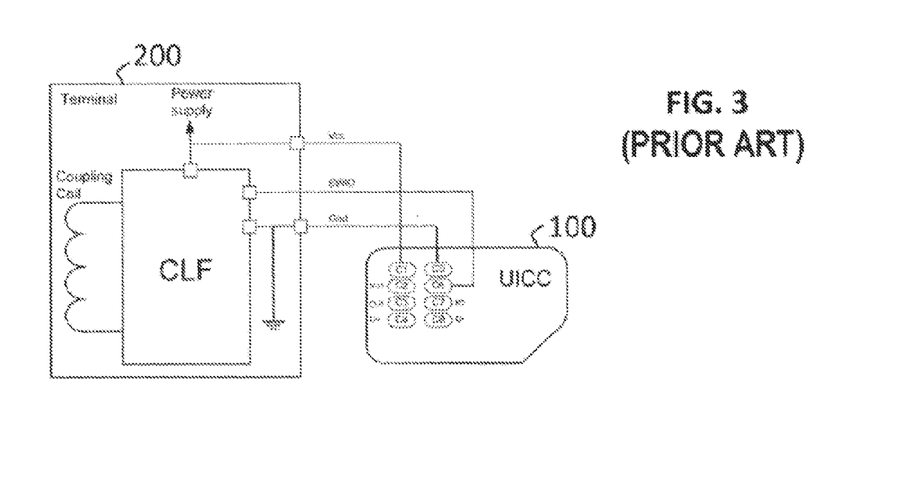

FIG. 3 shows the hardware implementation of the SWP interface of FIG. 2, as described in Chapter 5.1 of ETSI document TS 102 613 V9.2.0.

Unfortunately, the SWP protocol does not provide a mechanism equivalent to in the one of the above-described ISO 7816 protocol which aims at enabling a microcircuit card 200 to request the contactless communication module 100 to continue to power it outside periods needed for master/slave type exchanges between those entities.

Consequently, the present state of the art does not provide a solution for a microcircuit card for guarantying that it will be powered by the terminal to which it is connected via an SWP interface for a length of time that is sufficient to enable it to carry out an internal operation in full.

The present invention seeks to provide a mechanism that does not present the above-mentioned drawbacks.

OBJECT AND SUMMARY OF THE INVENTION

More precisely, the invention provides a method of setting up a communication session performed by a microcircuit card for setting up a communication session with a contactless communication module via an SWP interface.

The method comprises:

an initialization phase of said SWP interface; and a negotiation phase between the microcircuit card and the contactless communication module, the contactless communication module being suitable for maintaining the power supply to said microcircuit card during these two phases.

In accordance with the invention, the microcircuit card prolongs the negotiation phase until the end of a procedure internal to the microcircuit card.

Correspondingly, the invention also provides a microcircuit card including a module for setting up a communication session with a contactless communication module via an SWP interface, and a module for executing an initialization phase of the SWP interface in collaboration with the contactless communication module.

The microcircuit card of the invention is remarkable in that it includes a module for prolonging a negotiation phase with the contactless communication module until the end of a procedure internal to the microcircuit card, the contactless communication module being suitable for maintaining the power supply of the microcircuit card during these two phases.

Thus, in general manner, the invention consists in prolonging the negotiation phase during which it is guaranteed that the microcircuit card remains powered by the contactless communication module, for the purpose of executing procedures that are internal to the microcircuit card.

In a particular embodiment, the microcircuit card sends RSET(2) frames to the contactless communication module in order to prolong the negotiation phase, so long as the internal procedure has not terminated.

In an implementation, the negotiation phase is prolonged by a callback function launched on startup of the internal procedure.

In an implementation, said internal procedure is a program received in a script.

In an implementation, said internal procedure is updating an operating system of the microcircuit card.

BRIEF DESCRIPTION OF THE DRAWINGS

Other characteristics and advantages of the invention appear in the light of the following description made with reference to the accompanying drawings, in which:

FIGS. 4A1 and 4A2 show two startup sequences in accordance with the prior art SWP protocol;

DETAILED DESCRIPTION OF AN EMBODIMENT

Figure 4A:
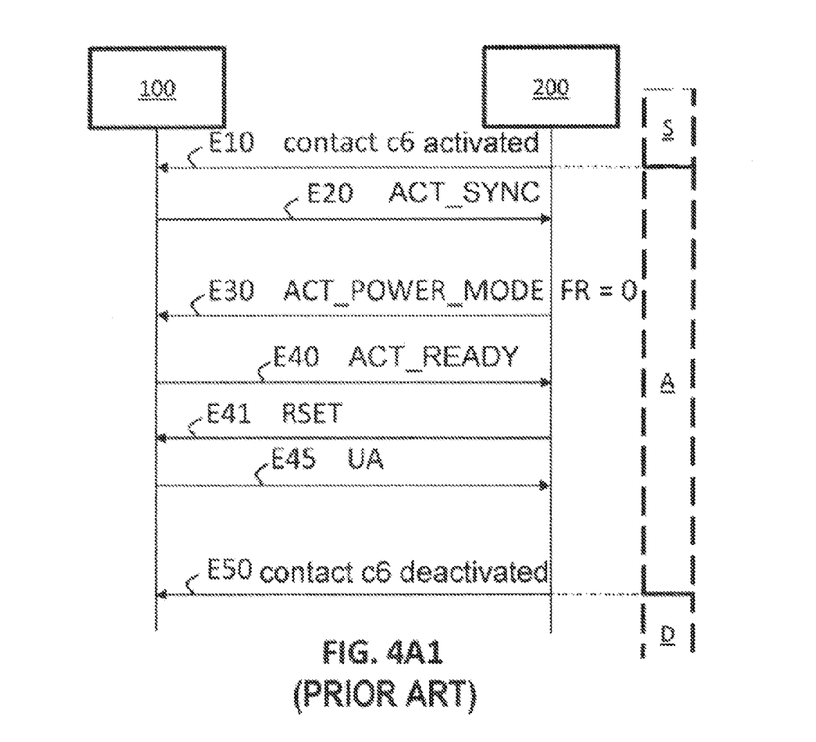

FIG. 4A1 shows a startup sequence in accordance with the SWP standard. For more information, the person skilled in the art can refer to ESTI document TS 102 613 V9.2.0, and more particularly to Chapter 6.2.3.1 of that document.

It should be recalled that contact c6 of the microcircuit card (see FIG. 3) is used for exchanges between the microcircuit card 100 and the contactless communication module 200. Consideration is given to the situation in which the contactless communication module 200 has activated the contact c6 (signal SWIO has passed from state L to state H) in order to request the microcircuit card 100 to activate its SWP interface, with the microcircuit card replying to this invitation by placing the SWP interface in the suspended state "S".

In accordance with the standard, the contactless communication module 200 places the SWP interface into the activated state "A" during a step E10.

The microcircuit card 100 sends a frame ACT_SYNC during a step E20 and waits for the first frame from the contactless communication module 200.

On receiving the first valid ACT_SYNC frame, the contactless communication module 200 replies (in "full power" mode) by sending an ACT_POWER_MODE frame during a step E30, with the bit FR being set to 0.

The microcircuit card 100 replies to this frame by sending an ACT_READY frame during a step E40.

Thereafter, during a step E41, the contactless communication module sends an RSET frame to the microcircuit card 100; this card acknowledges this frame in a step E45 by sending a UA frame.

The first time a UA frame is sent by the microcircuit card 100 (step E45) marks the end of the initialization phase.

When this frame is being received by the contactless communication module 200, the SWP duplex interface is initialized and both of the entities 100 and 200 can send simplified high level data link control (SHDCL) frames.

As described in Chapter 8.3 of ETSI document TS 102 613 V9.2.0, the contactless communication module 200 can deactivate the SWP interface by holding the SWIO signal in the L state for at least a deactivation time duration p4 (Table 8.2 of ETSI document TS 102 613 V9.2.0) (step E50). The SWP interface then passes into the deactivated state "D".

Figure 4A:
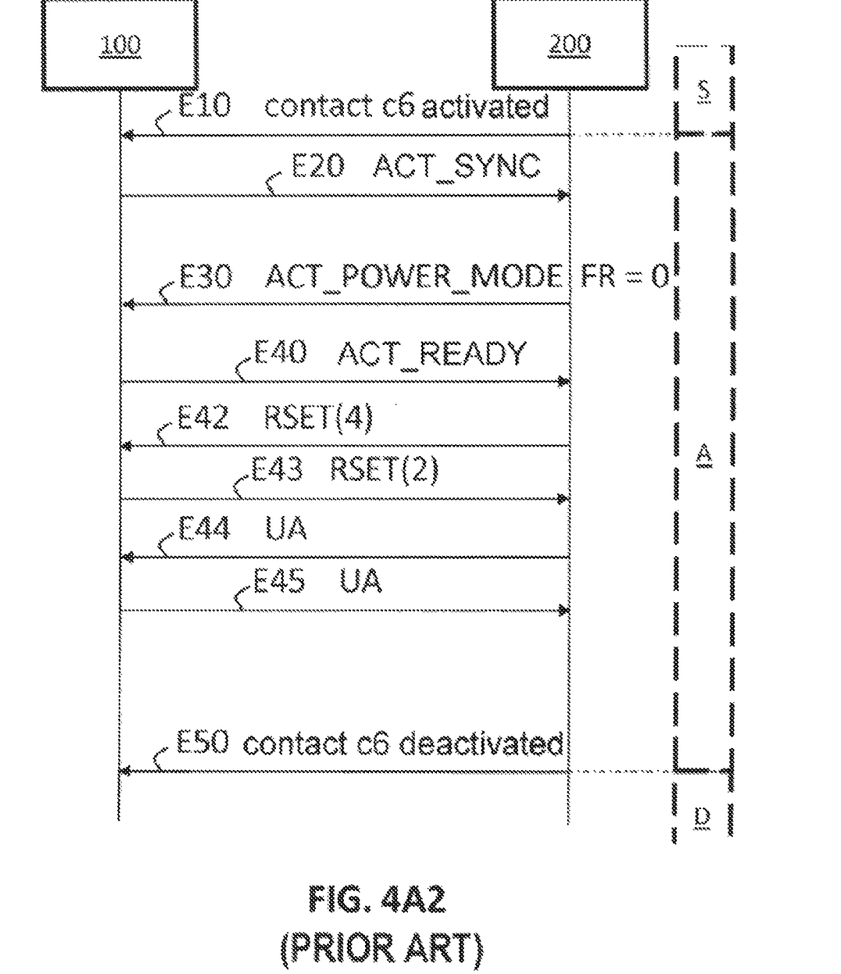

FIG. 4A2 shows another startup sequence in accordance with the SWP standard.

In this example, on receiving the ACT_READY frame in step E40, the contactless communication module 200 starts a negotiation phase by sending a RSET(4) frame in a step E42 for negotiating the size of the "sliding" window in compliance with Chapter 10.5 of ETSI document TS 102 613 V9.2.0.

In this example, the microcircuit card replies by sending an RSET(2) frame (step E43). In a step E44, the communication module sends an acknowledge message UA.

The end of the initialization phase is once more marked by the microcircuit card 100 sending a first message UA in step E45.

Figure 4B:
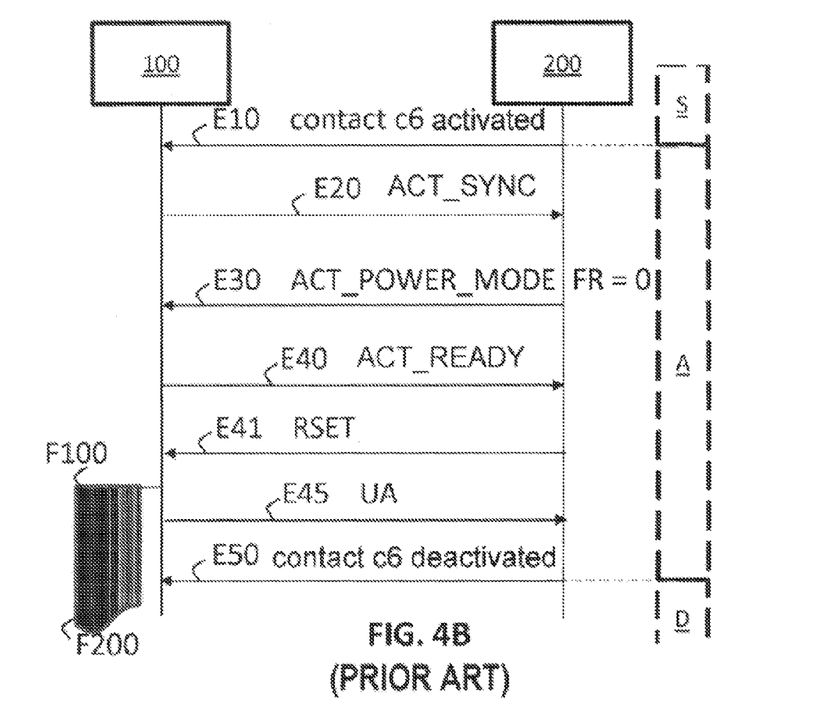
FIG. 4B shows a problem with such a startup sequence.

FIG. 4B is similar to FIG. 4A1 except that it shows a problem solved by the invention, and that occurs when:

in a step F100, the microcircuit card 100 starts an internal operation during a phase of configuring the SWP interface, and does so more precisely between activating the contact c6 in the step E10 and sending the first acknowledgment UA in the step E45; and the contactless communication module 200 ceases powering the card in step E50, even though the internal operation has not finished.

Under such circumstances, the internal operation stops prematurely during a step F200 for lack of power.

Figure 5:
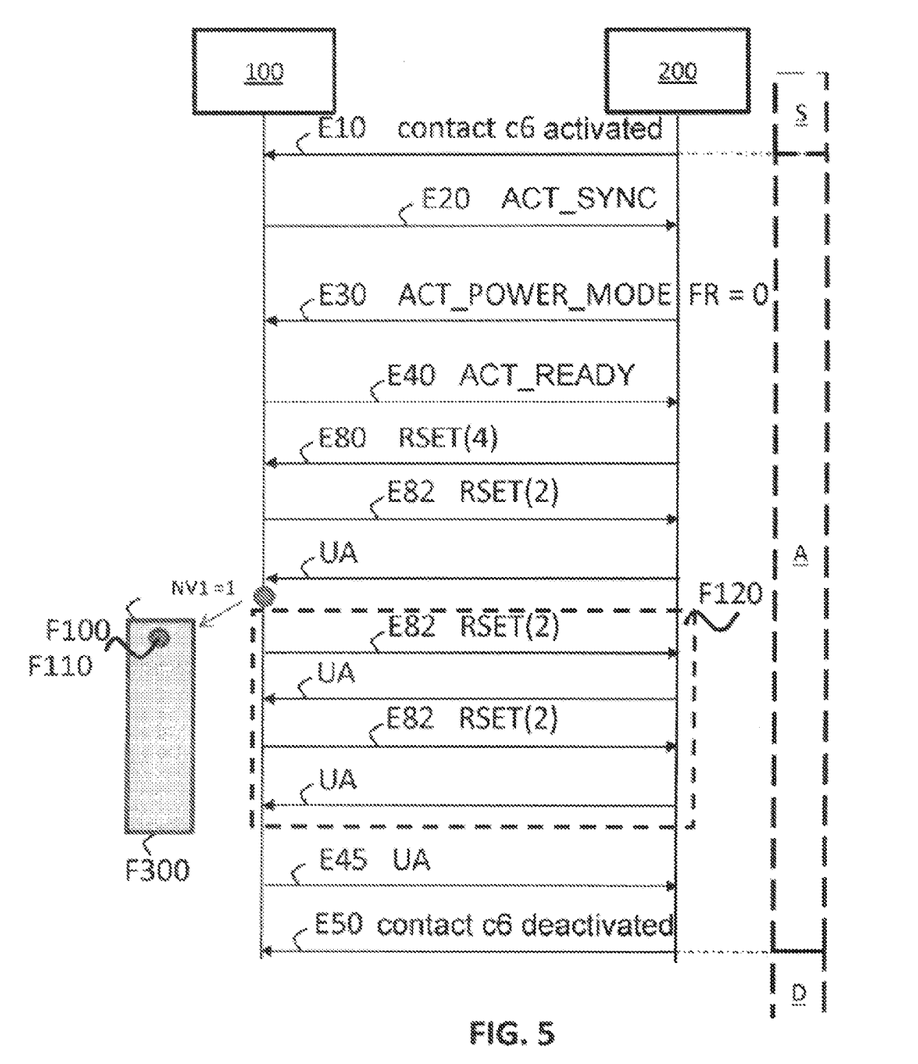
FIGS. 5 and 7 show a method of setting up a communication protocol in accordance with the invention.

FIG. 5 shows a particular implementation of the invention.

It is assumed in this example that the microcircuit card 100 has previously received a command script including instructions for performing an internal procedure consisting in updating the operating system of the microcircuit card in deferred manner, next time the card is started up.

In the presently-described implementation, on receiving such a script, the microcircuit card stores the data for updating the operating system in a memory and it initializes a variable NV1 to 1 to store the fact that the operating system needs to be updated.

In general manner, the invention consists in causing the microcircuit card 100 to prolong a negotiation phase F120 so long as the internal procedure (specifically updating the operating system) has not finished, in order to ensure that the contactless communication module 200 does not deactivate the SWP interface.

In the presently-described implementation, this prolongation is obtained by sending RSET(2) messages during steps E82.

For this purpose, in the example of FIG. 5, the microcircuit card 100 tests the value of the variable NV1 after receiving a first message UA from the module 200.

When this variable NV1 is equal to 1, the microcircuit card replies in a loop to successive acknowledgment messages UA received from the contactless communication module 200 until the end of the internal procedure (step F300).

Figures 6A, 6B:
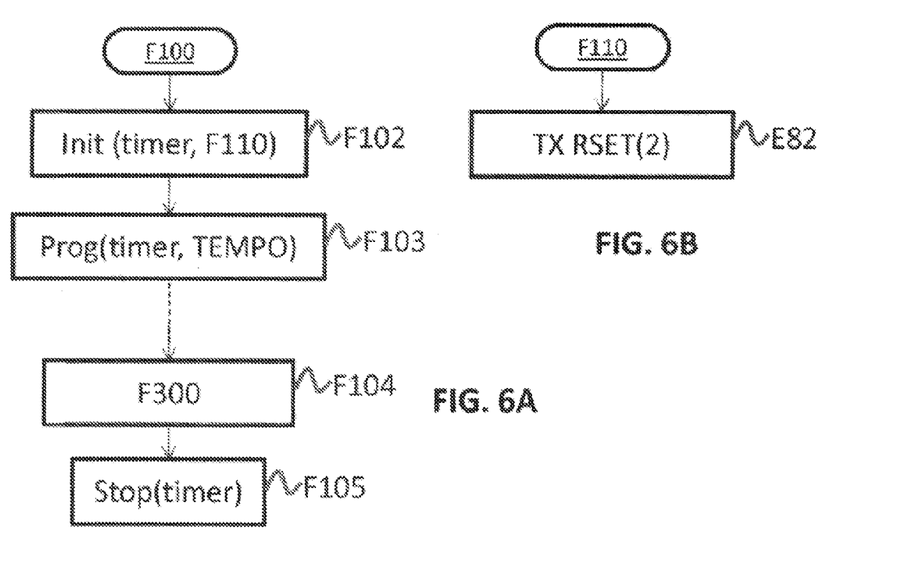
FIGS. 6A and 6B show a particular implementation of the FIG. 5 mechanism.

FIGS. 6A and 6B show an implementation in which this repetition is performed by a callback function from the start of the internal procedure.

FIG. 6A is in the form of a flow chart showing the main steps of the internal procedure in a particular implementation.

During a step F102, a timer is associated with the callback function F110, the timer being initialized in step F103 with a time constant TEMPO. Consequently, the callback function F110 is executed every TEMPO seconds, with this execution consisting in sending the RSET(2) frame in step E82.

In the presently-described implementation, the internal procedure consists in updating the operating system of the microcircuit card with the previously stored data.

At the end of the internal procedure (step F300), the timer is discontinued.

Figure 7:
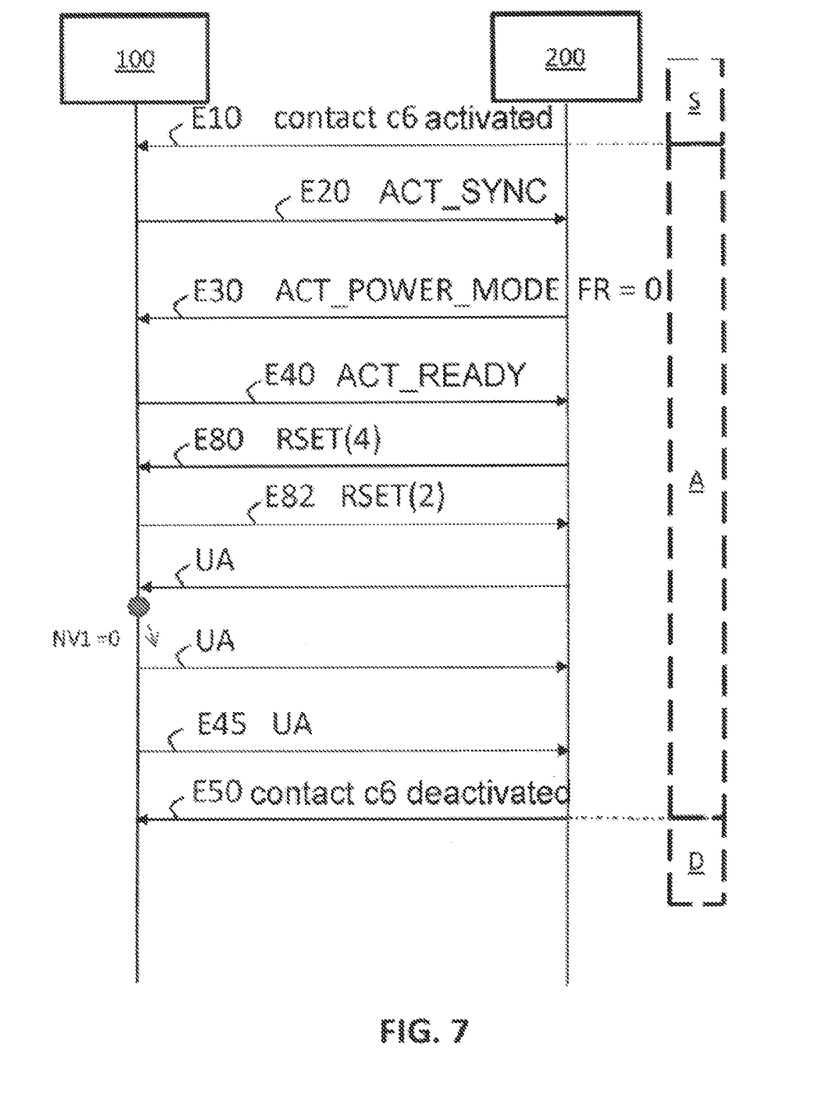

With reference to FIG. 7, if the microcircuit card determines that the variable NV1 is equal to 0, it acknowledges the first message UA received from the module 200 directly by sending a message UA as in the present state of the art.

The invention claimed is:

1. A method of setting up a communication session performed by a microcircuit card for setting up a communication session with a contactless communication module via an SWP interface, said method comprising:
    an initialization phase of said SWP interface; and
    a negotiation phase between the microcircuit card and the contactless communication module;
    said contactless communication module being suitable for maintaining the power supply to said microcircuit card during said phases;
    wherein said microcircuit card prolongs said negotiation phase until the end of a procedure internal to the microcircuit card.

2. A method according to claim 1, wherein in order to prolong said negotiation phase, said microcircuit card sends RSET frames to said contactless communication module.

3. A method according to claim 1, wherein the negotiation phase is prolonged by a callback function launched on startup of the internal procedure.

4. A method according to claim 1, wherein said internal procedure is a program received in a script.

5. A method according to claim 1, wherein said internal procedure is updating an operating system of the microcircuit card.

6. A microcircuit card comprising:
    a module for setting up a communication session with a contactless communication module via an SWP interface,
    a module for executing an initialization phase of said SWP interface in collaboration with said contactless communication module, and
    a module for prolonging a negotiation phase with the contactless communication module until the end of a procedure internal to the microcircuit card, said contactless communication module being suitable for maintaining the power supply of said microcircuit card during said phases.

7. A microcircuit card according to claim 6, wherein said module for prolonging the negotiation phase comprises a module for sending RSET frames to the contactless communication module.

8. A microcircuit card according to claim 6, wherein said module for prolonging the negotiation phase is implemented by a callback function of said procedure internal to the card.

* * * * *